US011084188B2

(12) United States Patent
Cook

(10) Patent No.: US 11,084,188 B2
(45) Date of Patent: Aug. 10, 2021

(54) THREE-DIMENSIONAL STRUCTURE AND METHOD AND SYSTEM OF MAKING SAME

(71) Applicant: Andrew Cook, Fort Erie (CA)

(72) Inventor: Andrew Cook, Fort Erie (CA)

( * ) Notice: Subject to any disclaimer, the term of this patent is extended or adjusted under 35 U.S.C. 154(b) by 570 days.

(21) Appl. No.: 15/915,704

(22) Filed: Mar. 8, 2018

(65) Prior Publication Data

US 2018/0257266 A1 Sep. 13, 2018

Related U.S. Application Data

(60) Provisional application No. 62/469,276, filed on Mar. 9, 2017.

(51) Int. Cl.
| | |
|---|---|
| B29B 15/14 | (2006.01) |
| B29C 64/118 | (2017.01) |
| B29C 64/379 | (2017.01) |
| B29C 64/209 | (2017.01) |
| B29C 70/34 | (2006.01) |
| B29C 70/38 | (2006.01) |
| B29B 15/12 | (2006.01) |
| B33Y 40/00 | (2020.01) |
| B33Y 10/00 | (2015.01) |
| B33Y 30/00 | (2015.01) |

(52) U.S. Cl.
CPC ............ *B29B 15/14* (2013.01); *B29C 64/118* (2017.08); *B29C 64/209* (2017.08); *B29C 64/379* (2017.08); *B29C 70/347* (2013.01); *B29C 70/382* (2013.01); *B29B 15/122* (2013.01); *B33Y 10/00* (2014.12); *B33Y 30/00* (2014.12); *B33Y 40/00* (2014.12)

(58) Field of Classification Search
CPC ...................................................... B29B 15/14
See application file for complete search history.

(56) References Cited

U.S. PATENT DOCUMENTS

| | | | |
|---|---|---|---|
| 2006/0136043 A1* | 6/2006 | Cully ................. | A61B 17/0057 623/1.22 |
| 2009/0319028 A1* | 12/2009 | Ramzipoor ............. | A61L 31/14 623/1.17 |

* cited by examiner

*Primary Examiner* — Larry W Thrower
(74) *Attorney, Agent, or Firm* — Emerson, Thomson & Bennett, LLC; Roger D. Emerson; Peter R. Detorre

(57) ABSTRACT

An improved three-dimensional structure and method and system of making same is provided, wherein the method for forming the three-dimensional structure comprises: coating a filament with a curable resin; directing a first portion of the coated filament around a plurality of pins fixed to and extending outwardly from a frame, the coated filament directed to intersect according to a pre-set pattern, the coated filament forming a first filament layer; directing a second portion of the coated filament about said pins forming one or more subsequent filament layers aligned and in contact with the first filament layer, the filament layers collectively forming a filament stack, the filament stack having a predetermined height and defining the intersecting panel elements; and curing the curable resin such that it hardens and retains the individual filament layers forming the filament stack in a three-dimensional shape.

8 Claims, 12 Drawing Sheets

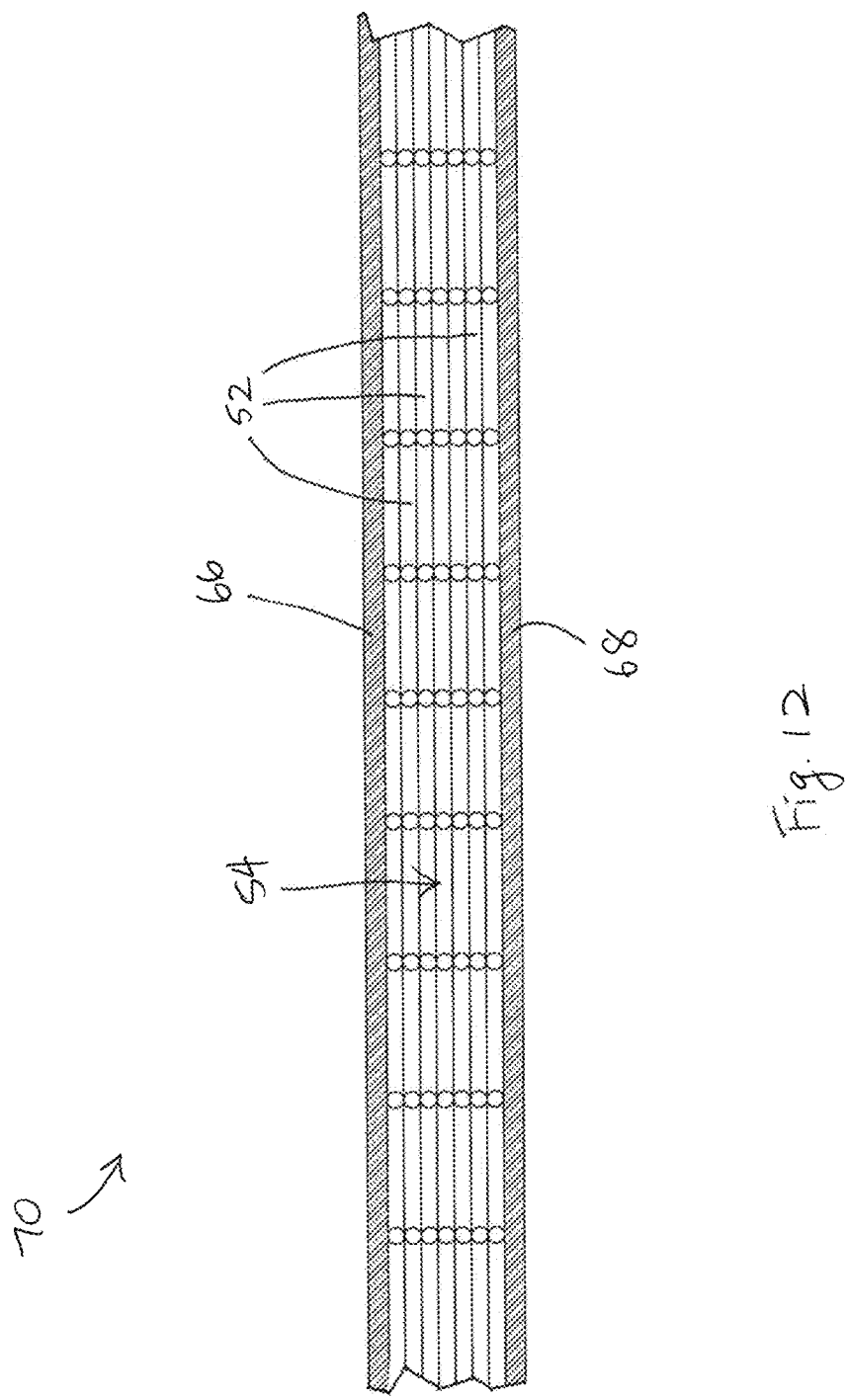

THREE-DIMENSIONAL STRUCTURE AND METHOD AND SYSTEM OF MAKING SAME

FIELD

This invention relates generally to three-dimensional structures and the production of three-dimensional structures from filaments.

BACKGROUND

In certain applications, durability, tensile strength, light reflection, and/or fire retardancy may be desirable qualities in three-dimensional structures which may be used in a variety of different applications, including ceiling grills, laminate panels, and light diffusers. Ease and speed of production and the ability to easily customize the physical characteristics of such structures may also be desirable.

SUMMARY

The invention, therefore, provides a method for forming a three-dimensional structure having intersecting panel elements which define a plurality of openings, the method comprising: coating a filament with a curable resin; directing a first portion of the coated filament around a plurality of pins fixed to and extending outwardly from a frame, the coated filament directed to intersect according to a pre-set pattern, the coated filament forming a first filament layer; directing a second portion of the coated filament about said pins forming one or more subsequent filament layers aligned and in contact with the first filament layer, the filament layers collectively forming a filament stack, the filament stack having a predetermined height and defining the intersecting panel elements; and curing the curable resin such that it hardens and retains the individual filament layers forming the filament stack in a three-dimensional shape.

In another aspect there is provided a system for forming a three-dimensional structure, the system comprising: a tool head having a barrel secured thereto, the barrel containing a curable resin and having a die needle operatively associated with an end of the barrel, the barrel in fluid communication with the die needle; a frame arrangement having a frame and a plurality of pins fixed to and extending outwardly from the frame; and a curing chamber; wherein a filament drawn through the barrel is coated by the curable resin therein, the coated filament passed through the die needle and directed around the plurality of pins according to a pre-set pattern to form a filament stack of multiple filament layers.

In another aspect there is provided three-dimensional structure having intersecting panel elements which define a plurality of openings, the panel elements comprising: a filament stack comprised of a plurality of filament layers stacked in parallel and collectively defining the panel elements; each filament layer comprising one or more filaments coated in a first curable resin, the coated filaments intersecting according to a pre-set pattern, wherein the filament stack retains the filament layers in the pre-determined three-dimensional shape after the curable resin is cured.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of examples, to the accompanying drawings which show exemplary embodiments of the present invention in which:

FIG. 12 is a partial side view of the three-dimensional structure as shown in FIG. 10 in combination with an upper and a lower external layer forming a composite panel.

DESCRIPTION

The present invention may be embodied in a number of different forms. The specification and drawings that follow describe and disclose some of the specific forms of the invention.

Figure 1:
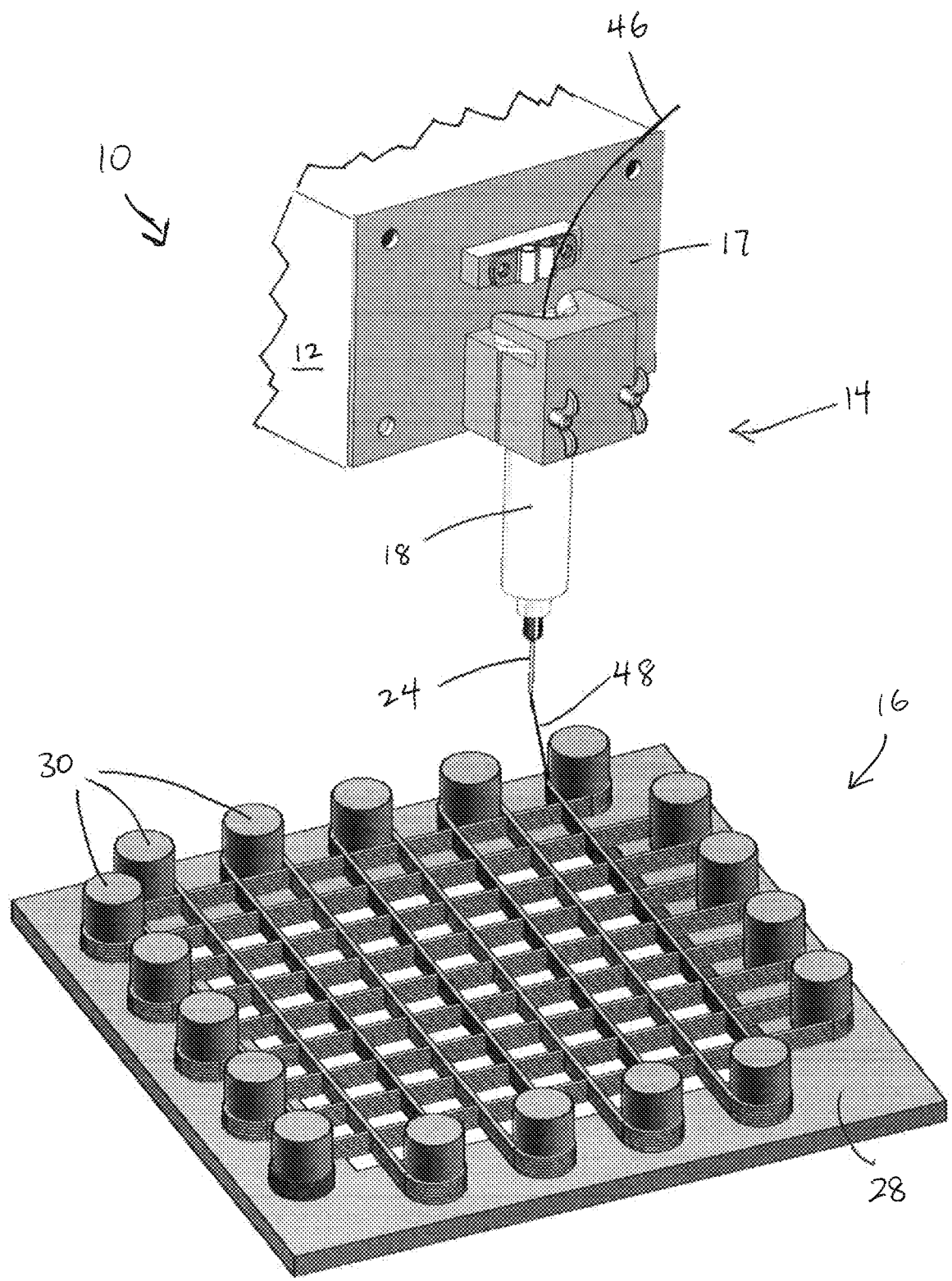
FIG. 1 is a perspective view of an exemplary system comprising a tool head and a frame arrangement for forming a three-dimensional structure according to an embodiment of the present invention.

Referring to the attached drawings, FIG. 1 shows a system 10 for forming a three-dimensional structure, having intersecting panel elements which define a plurality of openings, according to an embodiment of the present invention. System 10 comprises a computer numeric control (CNC) system 12, a tool head 14, and a frame arrangement 16.

CNC system 12 can be any known manufacturing system involving computer-aided design (CAD) and computer-aided manufacturing (CAM) programming. Only the portion of CNC system 12 immediately adjacent to tool head 14 is shown in FIG. 1.

Figure 2:
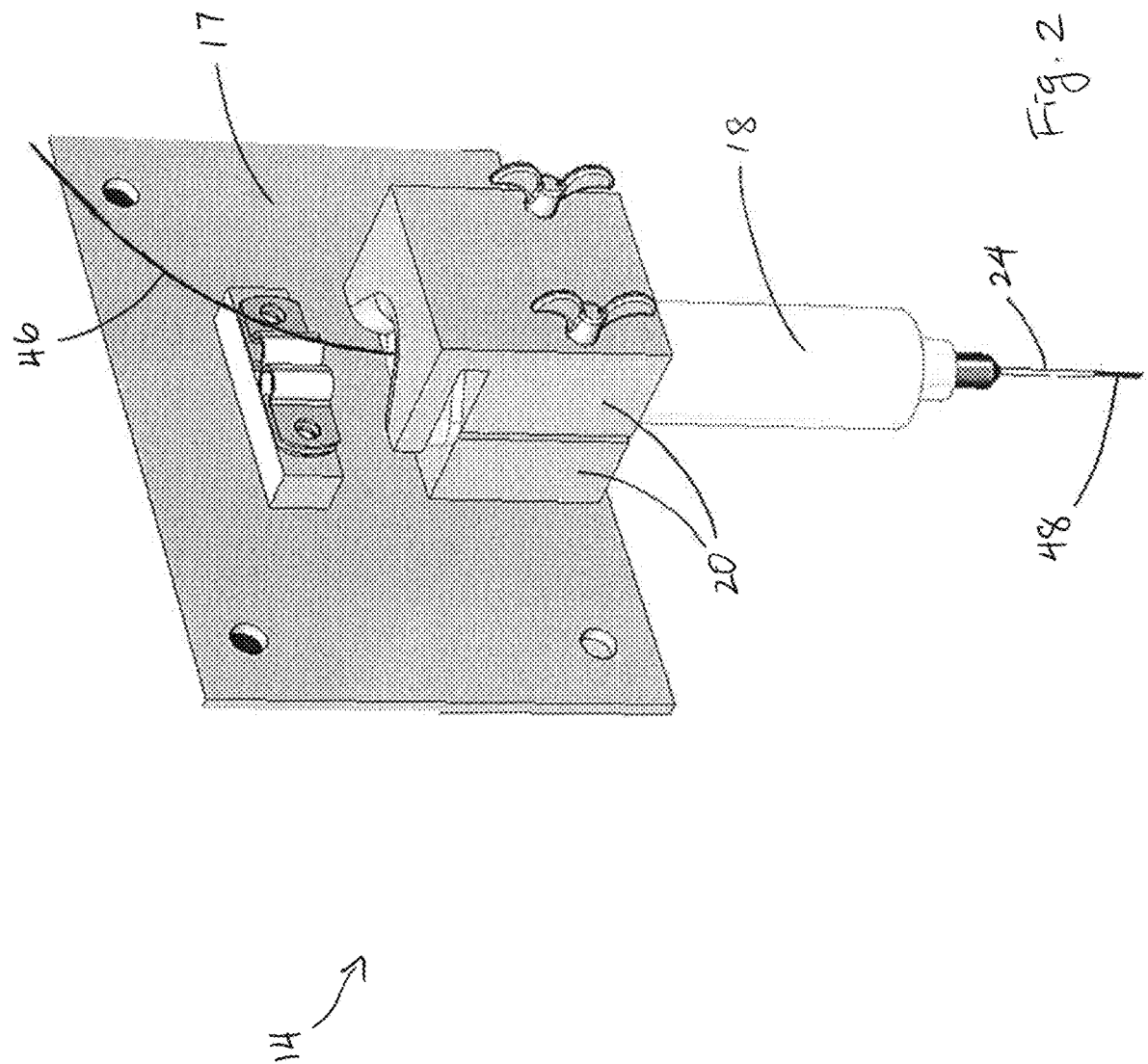
FIG. 2 is an enlarged view of the tool head of FIG. 1.
Figure 3:
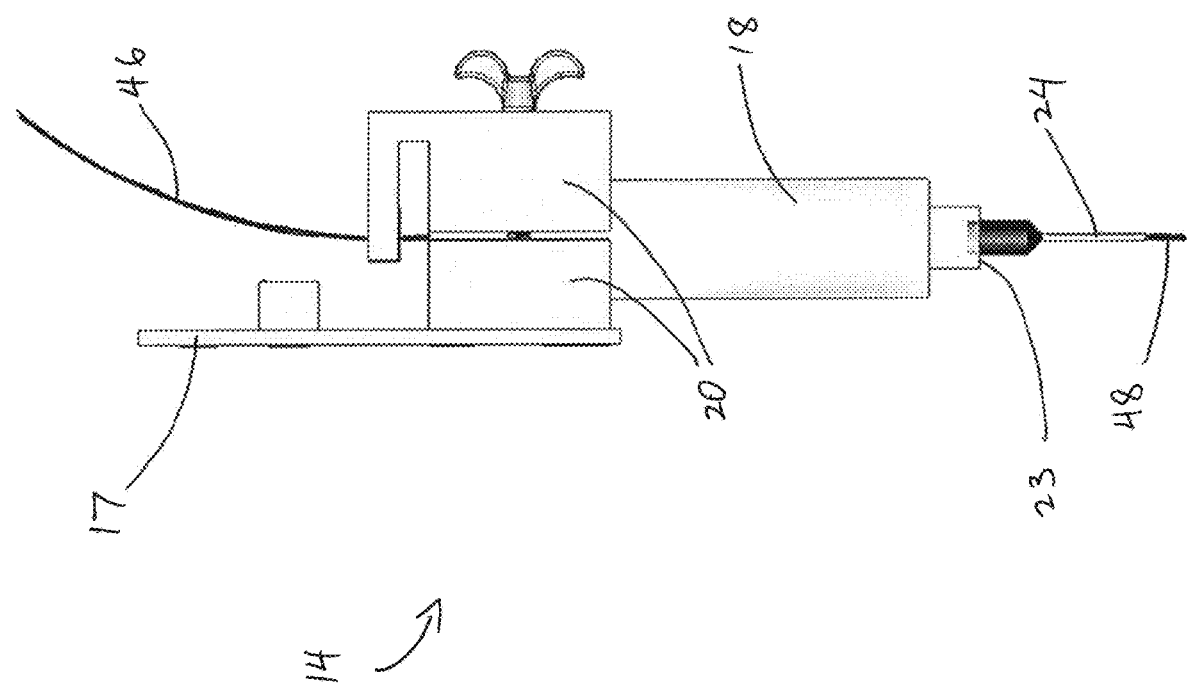
FIG. 3 is a side view of FIG. 2.
Figure 4:
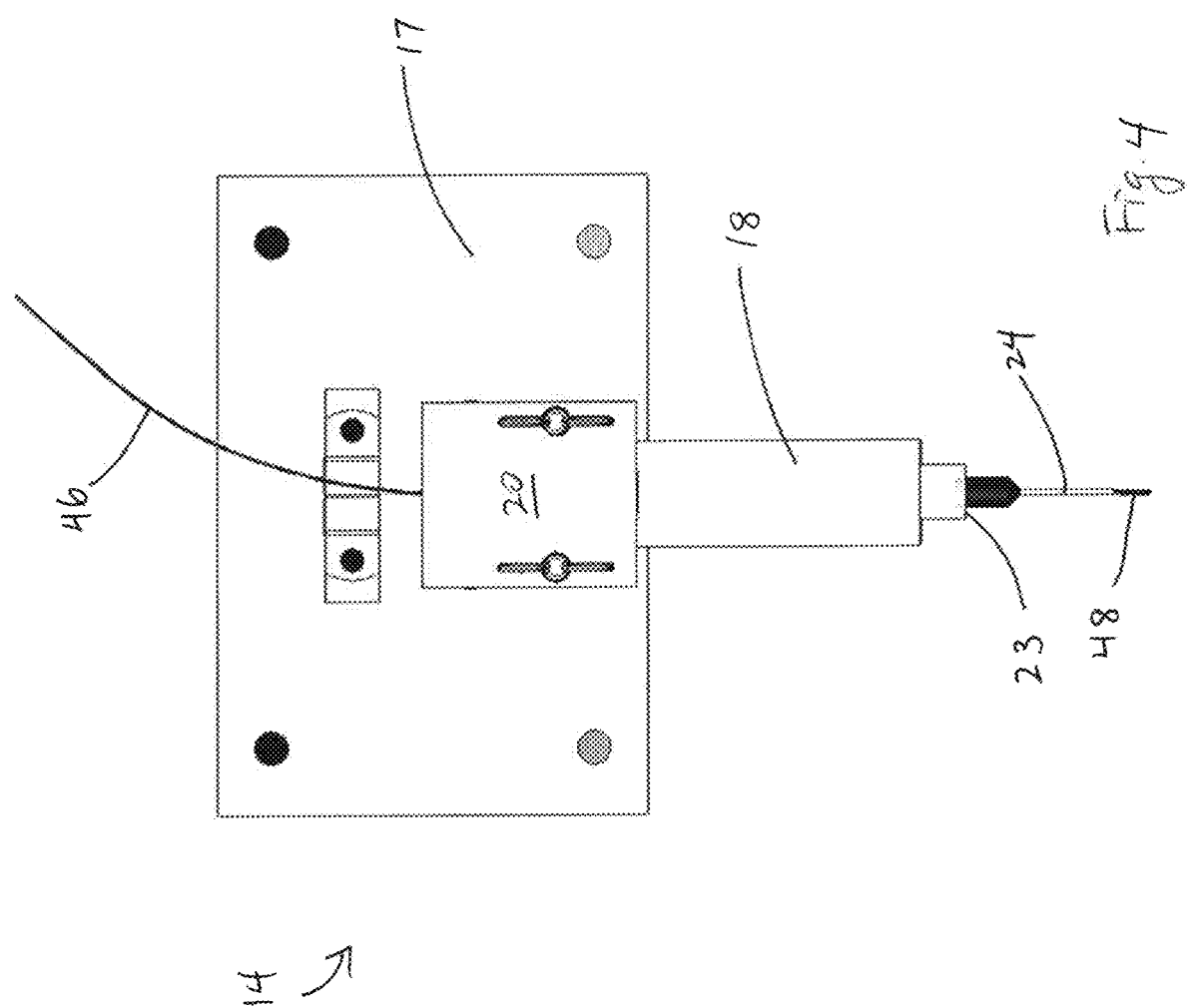
FIG. 4 is a front view of FIG. 2.
Figure 5:
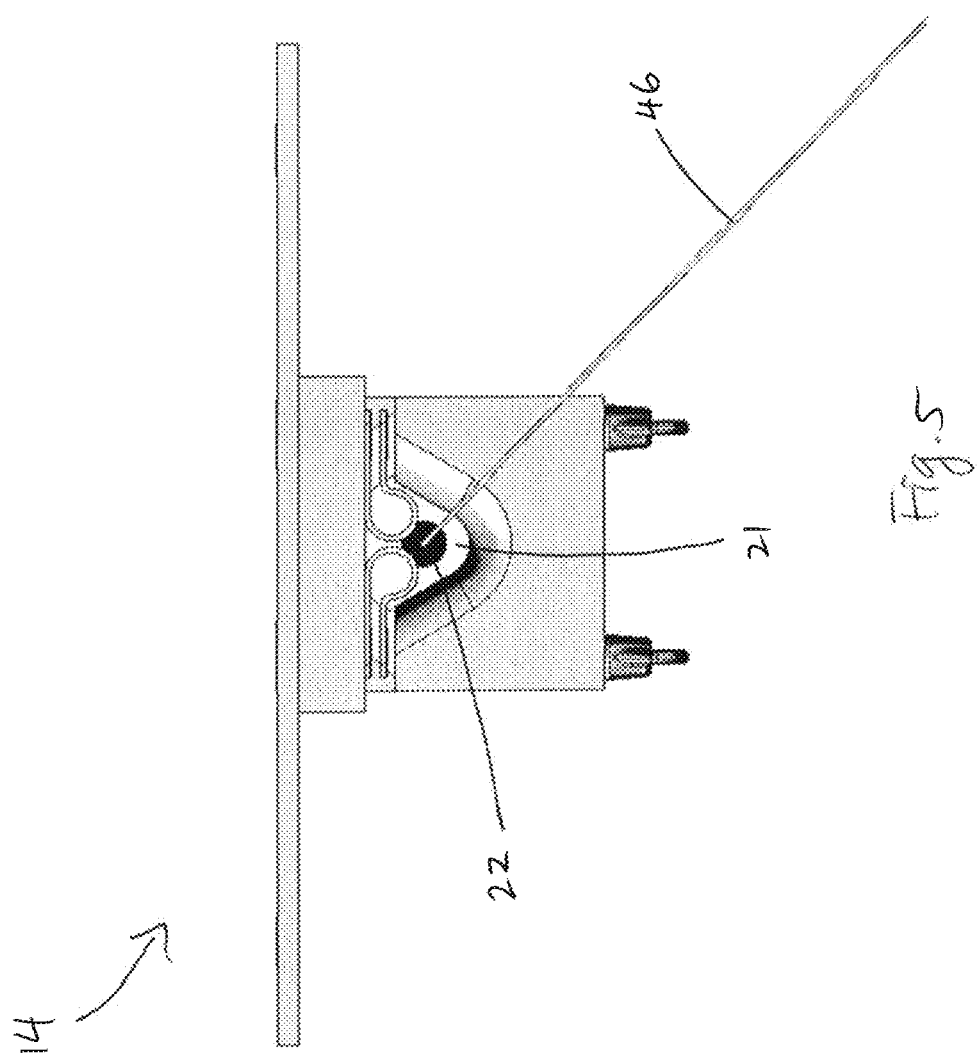
FIG. 5 is a plan view of FIG. 2.

In the embodiment of FIGS. 2-5, tool head 14 is removably coupled to CNC system 12 and generally comprises a base plate 17 and a barrel 18. Barrel 18 is removably secured to base plate 17 via clamps 20. As best seen in FIG. 5, barrel 18 has a first end 21 defining a filament opening 22. Barrel 18 extends from first end 21 to an opposed second end 23. A die needle 24 is fixed to and extends from second end 23. FIGS. 2-4 depict barrel 18 as being secured to base plate 17 such that barrel 18 and die needle 24 extend away, generally parallel, from base plate 17. A curable resin or coating substance (not shown) is in fluid communication and is delivered to die needle 24 via second end 23. While the term "curable resin" has been used throughout the specification, depending on the application, "curable resin" may be a traditional resin or resin type product, or may be a plastic or plastic-like substance, a rubber or rubber-like substance, a PVC-type material, or other similar or such material that can be applied in a liquid or semi-liquid state and that hardens or solidifies into a solid state.

Figure 6:
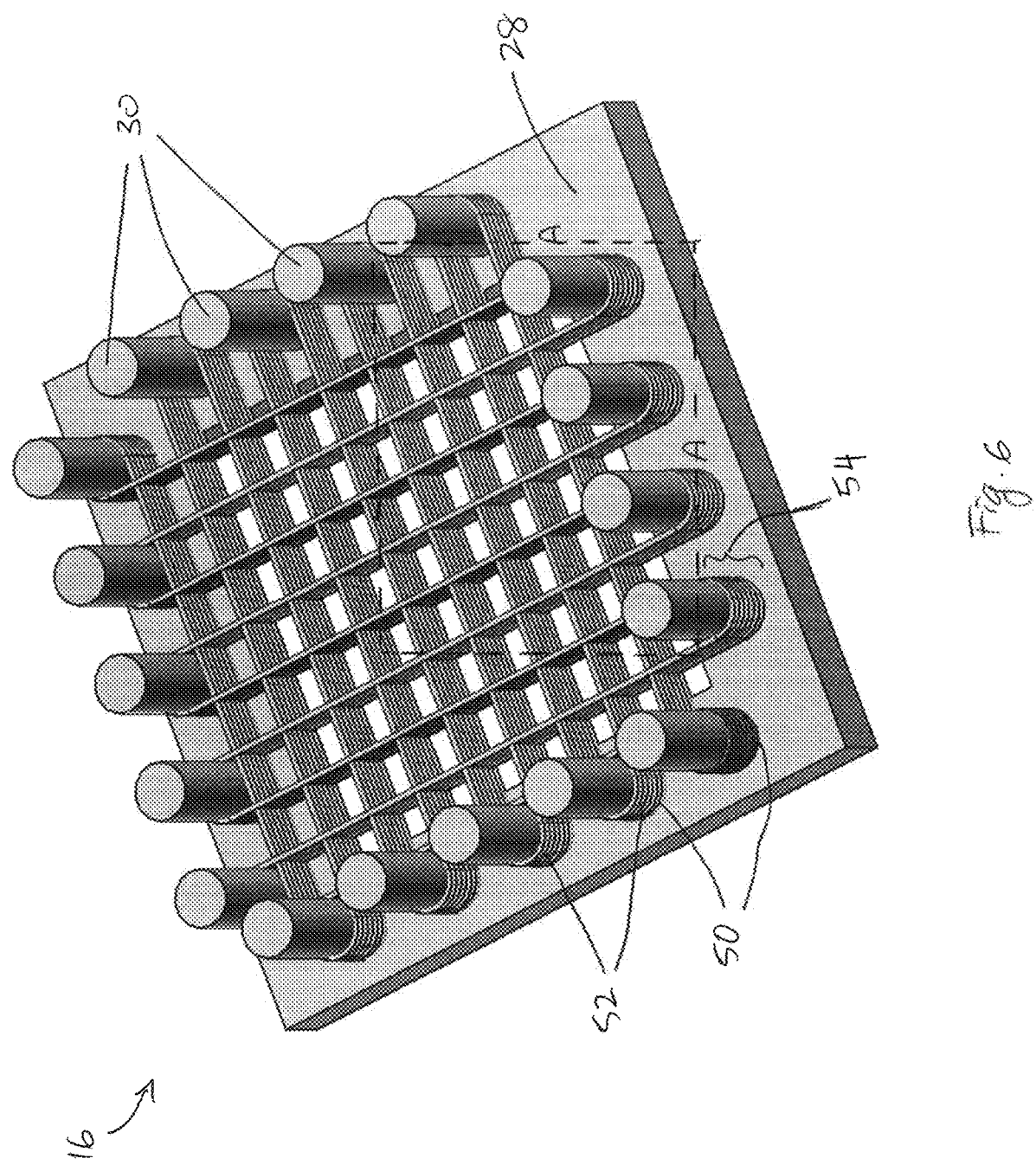
FIG. 6 is an enlarged upper perspective view of the frame arrangement of FIG. 1.
Figure 7:
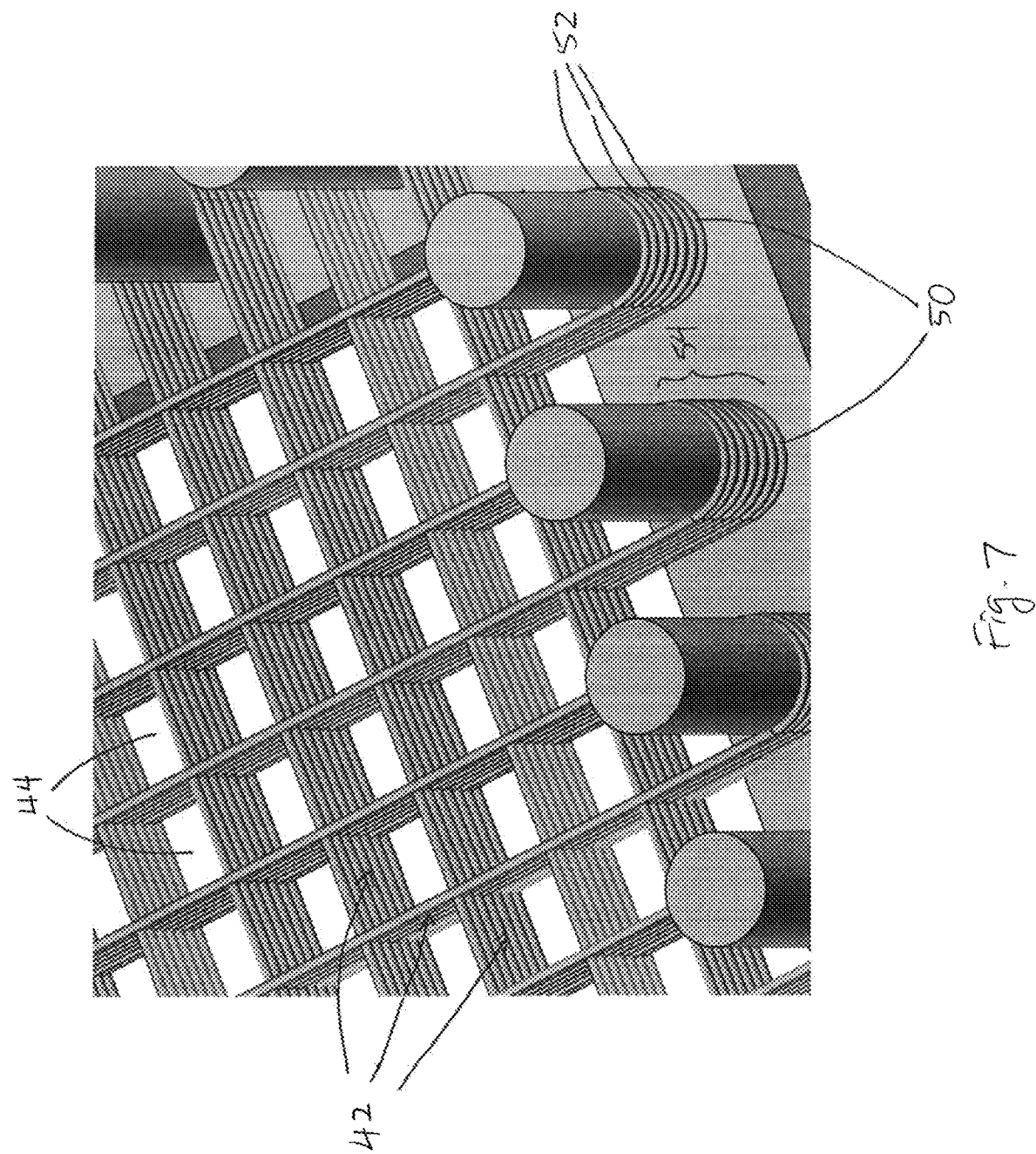
FIG. 7 is an enlarged view of portion A of FIG. 6.

FIGS. 6 and 7 depict an exemplary embodiment of frame arrangement 16. In this embodiment, frame arrangement 16 comprises a generally planar rectangular frame 28 and a plurality of pins 30. Pins 30 are fixed along frame 28 at predetermined intervals and extend outwardly, generally perpendicular, from frame 28. While pins 30 are shown in FIGS. 6 and 7 to be cylindrical and to extend generally perpendicularly from frame 28, a person skilled in the art would understand that pins of different shape, size and angle of extension from frame 28 may alternatively be used.

Moreover, while a generally planar frame 28 is described and shown in the drawings, it will be understood that a frame having a curved or uneven surface may be used according to the present invention. In this way, a curved or generally non-planar three-dimensional product may be formed.

In the particular embodiment depicted in FIG. 1, tool head 14 and frame arrangement 16 are positioned relative to one another such that pins 30 extend from frame 28 towards tool head 14 and barrel 18 and die needle 24 extend from base plate 17 towards frame arrangement 16.

Figure 8:
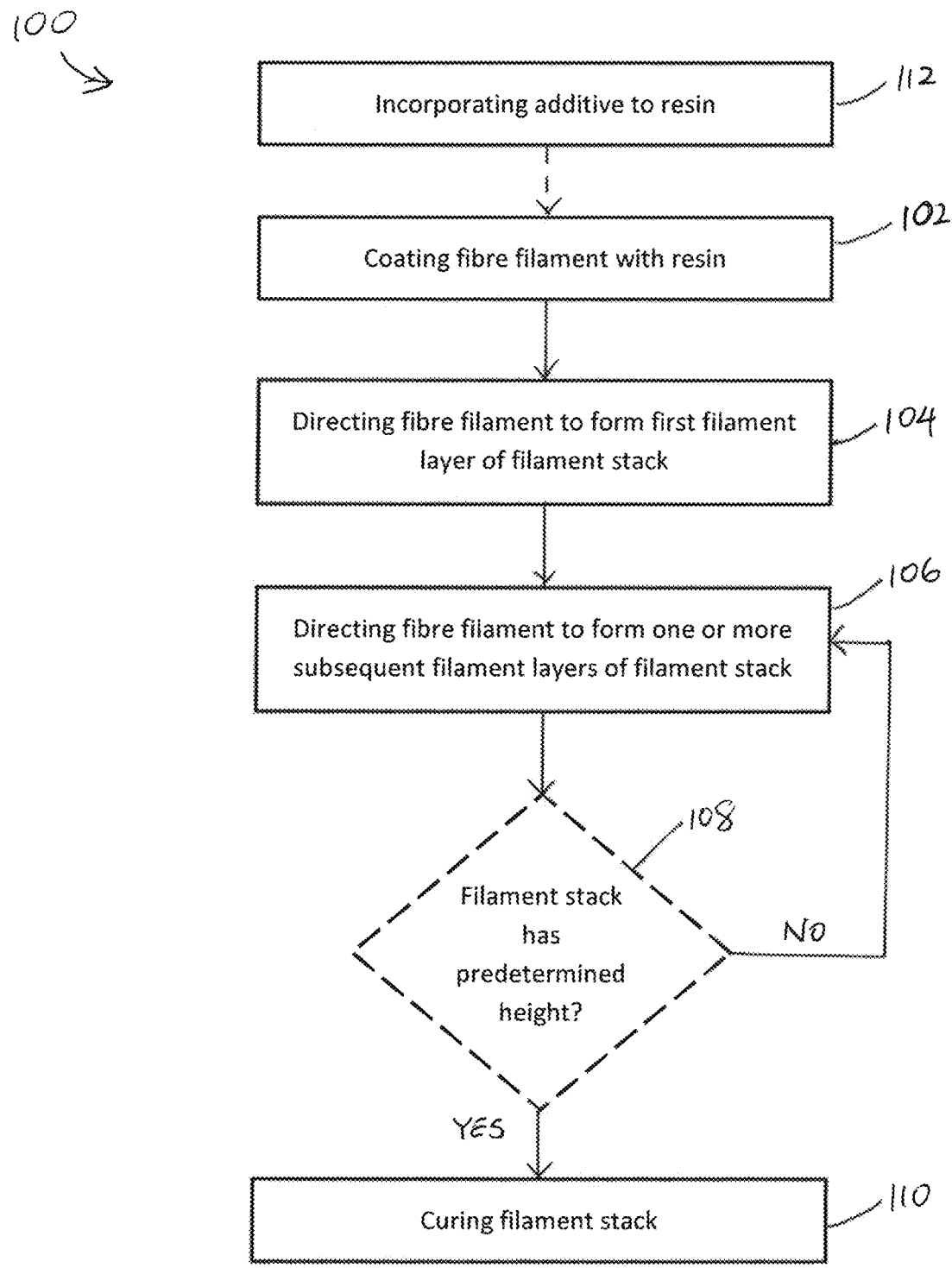
FIG. 8 is a flow chart illustrating an exemplary method for forming a three-dimensional structure according to an embodiment of the present invention.

A first exemplary method 100 for forming a three-dimensional structure is illustrated by the flow chart of FIG. 8.

At step 102, a filament 46 is coated with a resin. For example, as seen in FIG. 1, filament 46 enters barrel 18 through filament opening 22 and is drawn through the curable resin in barrel 18. In this way, filament 46 is coated in the curable resin, resulting in a coated filament 48.

As filament 46 is drawn through die needle 24, the amount of curable resin deposited on filament 46 is controlled by the size or bore of die needle 24 relative to the diameter of filament 46. If the diameter of die needle 24 is significantly larger than the diameter of filament 46, a relatively large amount of curable resin is deposited onto filament 46. If the diameter of die needle 24 is only slightly larger than the diameter of filament 46, a smaller amount of curable resin is deposited onto filament 46. In this way, the amount or volume of resin deposited onto filament 46 can be controlled by changing die needle 24 for a die needle having a desired bore diameter.

After coated filament 48 is extruded from die needle 24, at step 104, a first portion of coated filament 48 is directed around pins 30 according to a pre-set pattern, forming a first filament layer 50 (best seen in FIGS. 6 and 7). For example, in the embodiment depicted in FIG. 1, coated filament 48 is directed around pins 30 by movement of tool head 14 relative to frame arrangement 16. The movement of tool head 14, in turn, is controlled by CNC system 12. The pre-set pattern is preferably programmed into the CNC system prior to directing step 104. FIGS. 1, 6 and 7 show coated filament 48 as being directed around pins 30 in a grid pattern.

At step 106, a second portion of coated filament 48 is directed about pins 30 according to the pre-set pattern, forming one or more subsequent filament layers 52 aligned and in contact with (i.e. stacked sequentially on top of) first filament layer 50. First filament layer 50 and subsequent filament layer(s) 52 collectively form a filament stack 54. Filament stack 54 defines panel elements 42 and openings 44 (see FIGS. 6 and 7). At least the curable resin of each filament layer 50, 52 is in contact with the curable resin of immediately adjacent filament layers 50, 52.

As each subsequent filament layer 52 is formed, the CNC system monitors the height of filament stack 54. If, at step 108, filament stack 54 has not reached a pre-determined desired height, coated filament 48 continues to be directed about pins 30 according to the pre-set pattern, and subsequent filament layers 52 continue to be formed on frame arrangement 16. If filament stack 54 has reached the desired height, the CNC system stops directing coated filament 48 about pins 30 and filament stack 54 moves onto curing step 110. In this way, the height of filament stack 54 can be easily adjusted during production by merely instructing or reprogramming the CNC system.

At curing step 110, filament stack 54 on frame arrangement 16 is cured or hardened such that the curable resin retains each filament layer 50, 52 of filament stack 54 in desired three-dimensional shape. For example, in the embodiment of FIG. 6, filament stack 54 hardens to maintain a three-dimensional grid shape. The curing step can comprise any one or more common methods to harden the curable resin. For example, curing could involve heating filament stack 54, air-drying filament stack 54, spraying a chemical agent onto filament stack 54, applying UV light to filament stack 54, etc. As will be understood by one skilled in the art, the nature of curing step 110 will depend on the type of curable resin used in coating step 102.

The curing of the resin can be accomplished in a dedicated curing chamber which can supply the required lighting, heating, etc. Alternately, the curing of the resin can proceed in situ.

After filament stack 54 hardens (i.e. is cured), filament stack 54 may be separated from frame arrangement 16 and the edges of filament stack may be trimmed to remove excess hardened resin or to "smooth" off particular surfaces or edges.

Prior to coating step 102, an additive, not shown, may be incorporated into the curable resin at step 112. The additive can include be a colour dye, a fire retardant, a wetting agent, a binding agent, or a combination thereof. The additive may be incorporated into the curable resin in order to improve the efficiency of the production process or provide desired qualities to the final product.

Figure 9:
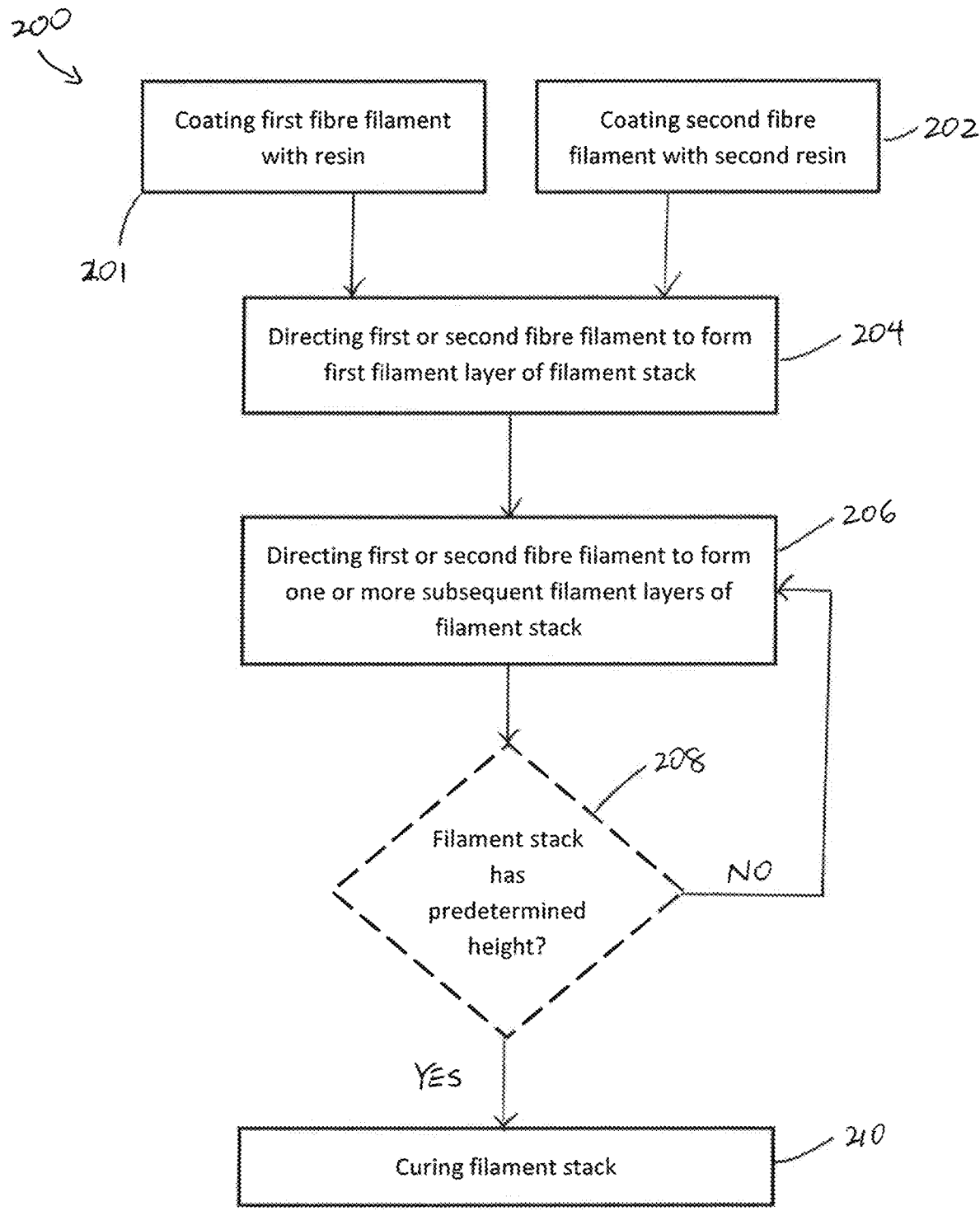
FIG. 9 is a flow chart illustrating an exemplary method for forming a three-dimensional structure according to another embodiment of the present invention.

A second exemplary method 200, for forming a three-dimensional structure in accordance with an embodiment of the invention, is illustrated by the flow chart of FIG. 9.

Similar to first method 100, second method 200 also involves filament 46 being coated in the first curable resin through barrel 18 as described above (step 201). Additionally, at step 202, a second filament, not shown, is coated in a second curable resin in a second barrel at a second tool head in a similar manner, resulting in a second coated filament. In second method 200, the second filament and/or the second resin may have different characteristics from filament 46 and the first curable resin. Like tool head 14, the second tool head is also preferably controlled by the CNC system.

In this way, at steps 204 and 206, coated filament 48 and the second coated filament are directed around pins 30 of frame arrangement 16 according to the pre-set pattern, forming successive filament layers have different qualities or characteristics. Coated filament 48 and the second coated filament may be directed by the CNC system around pins 30 alternately to form different portions of the pre-set pattern (consecutively or simultaneously), depending on the desired qualities of the final product. The filament layers so formed are also stacked, or aligned in contact, so as to form a filament stack having different physical and/or chemical properties throughout its structure.

The CNC system, as in first method 100, then determines at step 208 if the filament stack has reached the desired pre-determined height. If it has, the filament stack then moves to curing step 210. If not, method 200 returns to step

206. Following curing step 210, the cured filament stack may be removed from the frame arrangement and trimmed as discussed above.

As in the case of first method 100, an additional additive, may be incorporated into the first and/or second curable resin prior to coating steps 201 and 202 of second method 200.

Figure 10:
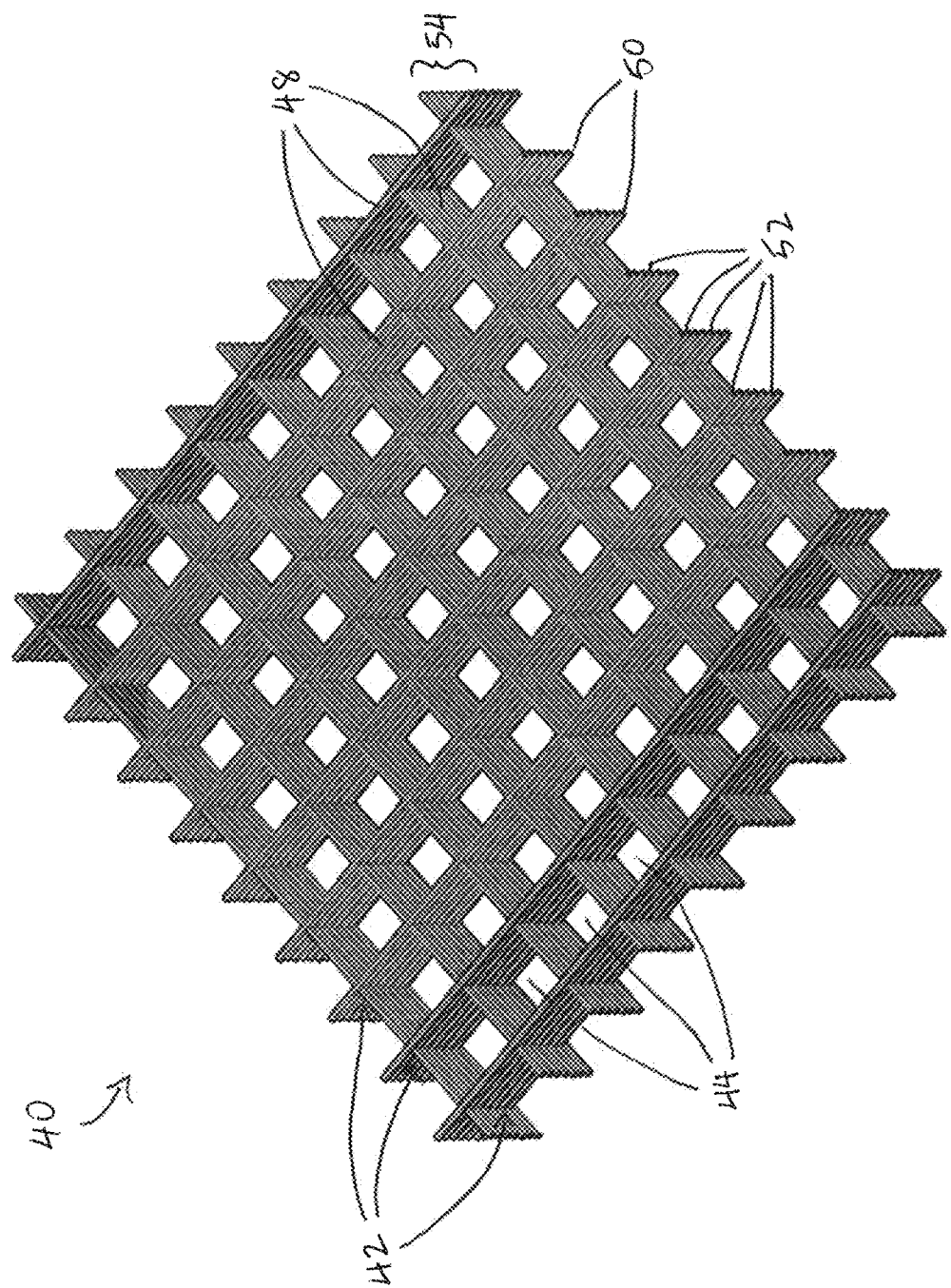
FIG. 10 is an upper perspective view of an exemplary three-dimensional structure according to an embodiment of the present invention.

An exemplary three-dimensional structure 40, which may be formed according to first method 100, according to second method 200, and/or from the use of system 10, is shown in FIG. 10. As depicted, structure 40 comprises intersecting panel elements 42 which define a plurality of openings 44. In the depicted embodiment, structure 40 comprises filament stack 54. Filament stack 54, itself, is formed from a plurality of filament layers 50, 52 aligned in contact (i.e. stacked in parallel). Filament layers 50, 52 collectively define panel elements 42. Each filament layer 50, 52 comprises one or more coated filaments 48, which are coated with curable resin. Coated filaments 48 are arranged to intersect according to the pre-set pattern. In the embodiment depicted in FIG. 10, coated filaments 48 are arranged to intersect at generally right angles, resulting in a grid pattern. As noted above, the curable resin in filament stack 54 retains filament layers 50, 52 in the pre-determined three-dimensional shape after the curable resin is cured.

Figure 11:
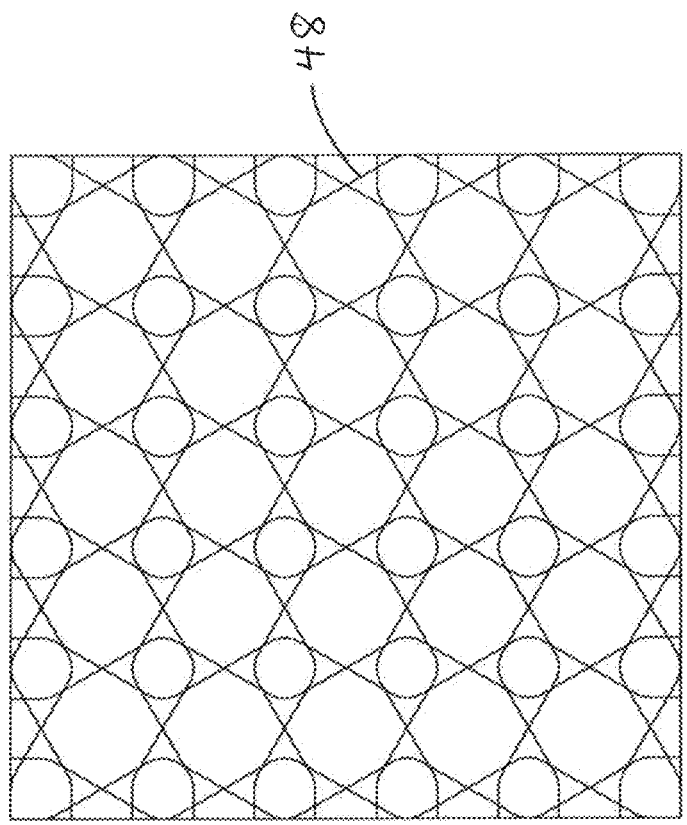
FIG. 11 is a plan view of an exemplary three-dimensional structure according to an alternative embodiment of the present invention.

Another exemplary three-dimensional structure 60, which may be formed according to first method 100, according to second method 200, and/or according to the use of system 10, is shown in FIG. 11. Coated filaments 48 are arranged in a more complex geometrical pattern. As will be understood by one skilled in the art, coated filament 48 may be directed according to any of a wide variety of patterns when forming the described three-dimensional structure.

Filaments 46 and the second filaments may be made from any of a number of different products, including cotton, bamboo, hemp, glass, carbon, Kevlar®, polyester, polyolefin, or metal. Further, one or both filaments may be of a single strand (monofilament) or a multiple strand construction.

The curable resin and the second curable resin may be a catalyzed resin, a thermoset resin, an air-dry resin or an acrylic resin.

It will thus be appreciated that the weight and strength of the finished product will largely be determined by the type of filament and/or curable resin used, for example, by modifying the size of the filament or by modifying the volume of the curable resin utilized.

The inventor has found that glass fibre single end yarn, such as K (EC13) single end yarn sold by PPG Fiber Glass, to be effective in certain applications of the above-described methods. The inventor has also found that a acrylic copolymer resin, such as Viakryl® sold by Allnex Belgium SA/NV, to be effective in certain applications. If K (EC13) single end yarn and Viakryl® are utilized to form a grid structure, it has been found that the resulting product, being a combination of resin and glass, is translucent, which tends to allow for increased light transmission. Such a grid structure may be useful as a light baffle or diffuser, particularly in suspended ceiling applications. Further, many jurisdictions have fire regulations limiting permissible smoke output of building materials in the event of fire. It has been found that this particular combination of resin and glass creates a more fire retardant material that tends to minimize smoke production when exposed to flame.

Another potential advantage of the present invention is that due to the successive filament layers, the resulting material/product is, in many cases, stiffer or more rigid than products made using more traditional methods or materials. The claimed system and methods may also allow for product to be produced in larger sizes than many known systems or methods. This tends to help to reduce the number of seams in large scale applications.

As noted, the curable resin used may alternately be a rubber, rubber-like, or other similar flexible or flexibly resilient type of material. In such cases, when hardened, the resulting product will tend to exhibit increased flexibility over situations where the curable resin presents a more rigid coating. Increased flexibility may be advantageous in the production of structures for particular applications. In addition, in some instances the form of the curable resin may be chosen for having regard to its sound proofing, light transmission or diffusion, or air flow characteristics.

Given the variety of possible resins and filaments that may be used, as noted above, filament stack 54 may be comprised of filament layers 50, 52 having varying physical and/or chemical qualities, thus forming a structure with varying physical and/or chemical qualities. For example, fibreglass filaments have desirable qualities including a relatively high strength to weight ratio and high durability. However, fibreglass is a relatively expensive material compared to, for instance, a plastic polymer. The described method may, therefore, be adapted such that filament layers 50, 52 may be alternatively formed from a fibreglass filament layer deposited over 2 or 3 plastic polymer filament layers. This may help to increase the strength/durability of the final product, while also helping to reduce overall production cost compared to a case where the entire structure is formed from fibreglass.

The described system and methods may also be adapted for the production of a structure having portions with varying physical or chemical qualities. The physical or chemical properties can be varied or controlled through use of different filaments and/or different resin materials. For example, if one were seeking to produce a structure to act as a light lens or diffuser as discussed above, one surface of the structure would, in use, be positioned adjacent the light source. As such, it may be desirable for the portion of the structure adjacent the light source to have more heat resistance and/or more fire retardant properties than the portion of the structure furthest away from the light source. Such a structure could be produced according to the presently claimed method with coated filament 48 first directed about frame arrangement 16 to form a filament stack having a pre-determined height. A second filament, coated in a second more heat resistant and/or more fire retardant resin, could be directed about frame arrangement 16 on top of the previously formed filament layers to form the remainder of the filament stack. The resulting structure would comprise two stacked portions, one which is more fire retardant and/or heat resistant than the other.

As a further variation to the above described product, methods and system, rather than coating the filament with a curable resin, an alternative embodiment could include using a filament that is pre-impregnated with a curable resin or other such material that can be hardened. In this manner, the coating step can be removed from the described method.

The three-dimensional structures described herein can be used in building structures alone or in combination with other components.

For example, FIG. 12 is a side view of filament stack 54, which defines an upper surface and a lower surface. As shown in FIG. 12, an upper external layer 66 is secured, or otherwise adhered, to the upper surface of filament stack 54, and a lower external layer 68 is secured, or otherwise adhered, to the lower surface of filament stack 54, collectively forming a composite panel 70. Composite panel 70 may be used to form building parts.

Optionally, an intermediate layer (not shown) may be secured or adhered between adjacent filament layers 52 during the production process to further strengthen composite panel 70. Upper external layer 66, lower external layer 68 and the intermediate layer may be comprised of a variety of different materials, including but not limited to metal, plastic, paper, cardboard, fibre glass, polyester, polyolefin fabric and/or carbon fibre. Alternatively, upper external layer 66, lower external layer 68, and the intermediate layer may be a resin layer or may be a layer encased in a resin or another material that can be hardened.

It will be appreciated by those skilled in the art that other variations of the embodiments described herein may also be practiced without departing from the scope of the invention. Other modifications are possible, as are the production of a very wide variety of products for other applications.

The invention claimed is:

1. A method for forming a rigid three-dimensional structure having intersecting panel elements which define a plurality of openings for incorporating into the structure of a building, the method comprising:
   coating a filament with a first curable resin;
   directing a first portion of the coated filament around a plurality of pins fixed to and extending outwardly from a frame, the coated filament directed to intersect according to a pre-set pattern, the coated filament forming a first filament layer;
   directing a second portion of the coated filament about said pins forming multiple subsequent filament layers, the first and subsequent filament layers collectively forming a filament stack, each subsequent filament layer aligned with and in contact with its immediately adjacent filament layer along its length, the filament stack having a predetermined height and defining the intersecting panel elements; and
   curing the first curable resin such that it hardens and retains the filament layers in a bonded configuration along their length, such that the filament stack has a rigid three-dimensional shape.

2. The method of claim 1, wherein an additive is incorporated into the first curable resin prior to the coating step.

3. The method of claim 2, wherein the additive is a colour dye, a fire retardant, a wetting agent, a binding agent, or a combination thereof.

4. The method of claim 1, wherein the coating step comprises drawing the filament through the first curable resin and then through a die needle.

5. The method of claim 4, further comprising varying the diameter of the die needle to vary the volume of the first curable resin coated onto the filament.

6. The method of claim 1, wherein directing the coated filament around the plurality of pins is controlled by a computer numeric control (CNC) system.

7. The method of claim 1, wherein the curing step comprises heating, air-drying, or applying UV light to the filament stack.

8. The method of claim 1, further comprising coating a second filament with a second curable resin different from the first curable resin, and directing the second coated filament around the plurality of pins according to the pre-set pattern, forming the filament stack.

* * * * *